(12) United States Patent
Walmsley

(10) Patent No.: US 8,829,322 B2
(45) Date of Patent: Sep. 9, 2014

(54) METRICAL GRID INFERENCE FOR FREE RHYTHM MUSICAL INPUT

(71) Applicant: Avid Technology, Inc., Burlington, MA (US)

(72) Inventor: Paul J. Walmsley, London (GB)

(73) Assignee: Avid Technology, Inc., Burlington, MA (US)

(*) Notice: Subject to any disclaimer, the term of this patent is extended or adjusted under 35 U.S.C. 154(b) by 137 days.

(21) Appl. No.: 13/662,041

(22) Filed: Oct. 26, 2012

(65) Prior Publication Data

US 2014/0116233 A1    May 1, 2014

(51) Int. Cl.
G10H 1/40 (2006.01)
G06K 9/00 (2006.01)
G10G 3/04 (2006.01)

(52) U.S. Cl.
CPC .............. *G10G 3/04* (2013.01); *G06K 9/00496* (2013.01)
USPC ................... 84/611; 84/609; 84/612; 84/635; 84/636; 84/649; 84/651; 84/652; 84/667; 84/668

(58) Field of Classification Search
CPC ................. G10H 2240/056; G10H 2210/066; G10H 2210/076; G10H 2210/081; G10H 2210/086; G10H 2220/081; G09B 15/00; G10G 3/04
See application file for complete search history.

(56) References Cited

U.S. PATENT DOCUMENTS

| | | | |
|---|---|---|---|
| 7,034,217 B2 * | 4/2006 | Pachet | 84/609 |
| 7,612,275 B2 * | 11/2009 | Seppanen et al. | 84/600 |
| 8,338,686 B2 * | 12/2012 | Mann et al. | 84/609 |
| 8,492,634 B2 * | 7/2013 | Savo et al. | 84/610 |
| 8,706,274 B2 * | 4/2014 | Kobayashi | 700/94 |
| 2002/0194984 A1 * | 12/2002 | Pachet | 84/609 |
| 2010/0170382 A1 * | 7/2010 | Kobayashi | 84/613 |
| 2010/0211200 A1 * | 8/2010 | Kobayashi | 700/94 |
| 2010/0305732 A1 * | 12/2010 | Serletic | 700/94 |
| 2010/0307321 A1 * | 12/2010 | Mann et al. | 84/613 |
| 2010/0319517 A1 * | 12/2010 | Savo et al. | 84/609 |
| 2010/0322042 A1 * | 12/2010 | Serletic et al. | 369/1 |
| 2011/0036231 A1 * | 2/2011 | Nakadai et al. | 84/477 R |
| 2012/0125179 A1 * | 5/2012 | Kobayashi | 84/611 |
| 2012/0297958 A1 * | 11/2012 | Rassool et al. | 84/609 |
| 2012/0297959 A1 * | 11/2012 | Serletic et al. | 84/626 |
| 2013/0025437 A1 * | 1/2013 | Serletic et al. | 84/634 |
| 2013/0220102 A1 * | 8/2013 | Savo et al. | 84/609 |
| 2014/0053710 A1 * | 2/2014 | Serletic et al. | 84/609 |
| 2014/0053711 A1 * | 2/2014 | Serletic et al. | 84/611 |

OTHER PUBLICATIONS

Ahlback, Sven, Goteborgs University Thesis, "Melody Beyond Notes, A Study of Melody Cognition", 2004, pp. 1-543.

(Continued)

*Primary Examiner* — Marlon Fletcher
(74) *Attorney, Agent, or Firm* — Oliver Strimpel

(57) ABSTRACT

Computer-based methods infer a metrical grid from music that has been input without a predetermined time signature or tempo, enabling such free rhythm input to be annotated with the inferred grid, and stored and transcribed as a musical score. The methods use Bayesian modeling techniques, in which an optimal metrical grid is inferred by identifying the metrical grid that best explains the given sequence of notes by maximizing the posterior probability that it represents the note sequence. Prior musical input from a given user as well as explicit information about the musical style of the input may be used to improve the accuracy of the transcription.

17 Claims, 3 Drawing Sheets

(56) References Cited

OTHER PUBLICATIONS

Sound On Sound, MOTO FreeStyle Sequencer, Mark of the Unicorn Freestyle MAC Sequencing Software, May 1998, 4 pages.

Apple, MainStage 2 User Manual, Apple, Inc., 2011, pp. 143-151.
Grachten, Maarten, et al., "Temp-Express: tempo transformations preserving musical expression", Workshop on Methods for Automatic Musica Performance and their Applications in a Public Rendering Contest, 2003, pp. 32-36.

* cited by examiner

METRICAL GRID INFERENCE FOR FREE RHYTHM MUSICAL INPUT

BACKGROUND

Systems that enable a user to record music for playback or for producing musical notation require that a tempo and a time signature for the music be supplied before the user can start recording. Once the user starts recording, he is constrained to play in time to a metronome click. This is an impediment to recording new ideas, as decisions about changes in tempo and time signature have to be made in advance and the user is unable to introduce timing variations that are a natural part of a performance. If the user opts to turn off the metronome click, he can record in an unconstrained manner, but the recording system is unable to interpret the musical data for quantization or displaying notation because the input is not aligned with an internal tempo map.

The requirement to pre-select a time signature and tempo is particularly difficult for less experienced users, who may not be familiar with music theory or even with musical notation. There is therefore a need for musical input systems that free users of this constraint.

SUMMARY

In general, the methods, systems, and computer program products described herein enable a musical input system to infer a metrical grid and a corresponding tempo based on the free rhythm musical input from the user, and optionally additional information about the musical style and the user's prior musical input. This frees the user from the need to specify a time signature and tempo prior to recording their performance.

In general, in one aspect, a method for free rhythm musical input includes: receiving musical input comprising a sequence of notes; determining an optimal metrical grid corresponding to the sequence of notes, wherein the optimal metrical grid is defined as the metrical grid that optimally represents the sequence of notes, and wherein determining the optimal metrical grid is based in part on an a priori probability of the occurrence of the optimal metrical grid; annotating the musical input with the optimal metrical grid; and storing a representation of the annotated musical input.

Various embodiments include one or more of the following features. The metrical grid comprises a time signature and a tempo. The method further includes generating a musical score representing the sequence of notes using the time signature and tempo. The optimal metrical grid comprises a plurality of tempos including the first-mentioned tempo. Each of the plurality of tempos starts at the beginning a measure based on the time signature. One or more of the plurality of tempos starts at a location other than the beginning of a measure based on the time signature. The a priori probability of a given one of the plurality of tempos representing a portion of the musical input is based in part on a characteristic of a portion of the musical input received prior to receiving the given portion. The optimal metrical grid comprises a plurality of time signatures, including the first-mentioned time signature. The method further comprises determining a start location for the optimal metrical grid. The method further includes modifying the received musical input by adjusting a temporal location of at least one of the sequence of notes to more closely conform to the optimal metrical grid. The sequence of notes is represented as a sequence of MIDI events. The musical input is received as audio input, and the sequence of notes is determined by analyzing the audio input. Determining the optimal metrical grid involves Bayesian modeling of the probabilities of a range of possible metrical grids for representing the sequence of notes. The a priori probability of the occurrence of the metrical grid is based in part on information about a musical style of the musical input. The musical input is received from a given user, and the a priori probability of the occurrence of the metrical grid is based in part on a musical style of the given user.

In general, in another aspect, a computer program product includes: a non-transitory computer-readable medium with computer program instructions encoded thereon, wherein the computer program instructions, when processed by a computer, instruct the computer to perform a method for free rhythm musical input, the method comprising: receiving musical input comprising a sequence of notes; determining an optimal metrical grid corresponding to the sequence of notes, wherein the optimal metrical grid is defined as the metrical grid that optimally represents the sequence of notes, and wherein determining the optimal metrical grid is based in part on an a priori probability of the occurrence of the optimal metrical grid; annotating the musical input with the optimal metrical grid; and storing a representation of the annotated musical input.

In general, in a further aspect, a system for free time musical input includes: an input for receiving music data comprising a sequence of notes; a memory for storing computer-readable instructions; and a processor connected to the memory, wherein the processor, when executing the computer-readable instructions, causes the free time musical input system to: determine an optimal metrical grid corresponding to the sequence of notes, wherein the optimal metrical grid is defined as the metrical grid that optimally represents the sequence of notes, and wherein determining the optimal metrical grid is based in part on an a priori probability of the occurrence of the optimal metrical grid; annotate the musical input with the optimal metrical grid; and store a representation of the annotated musical input.

DETAILED DESCRIPTION

Figure 1:
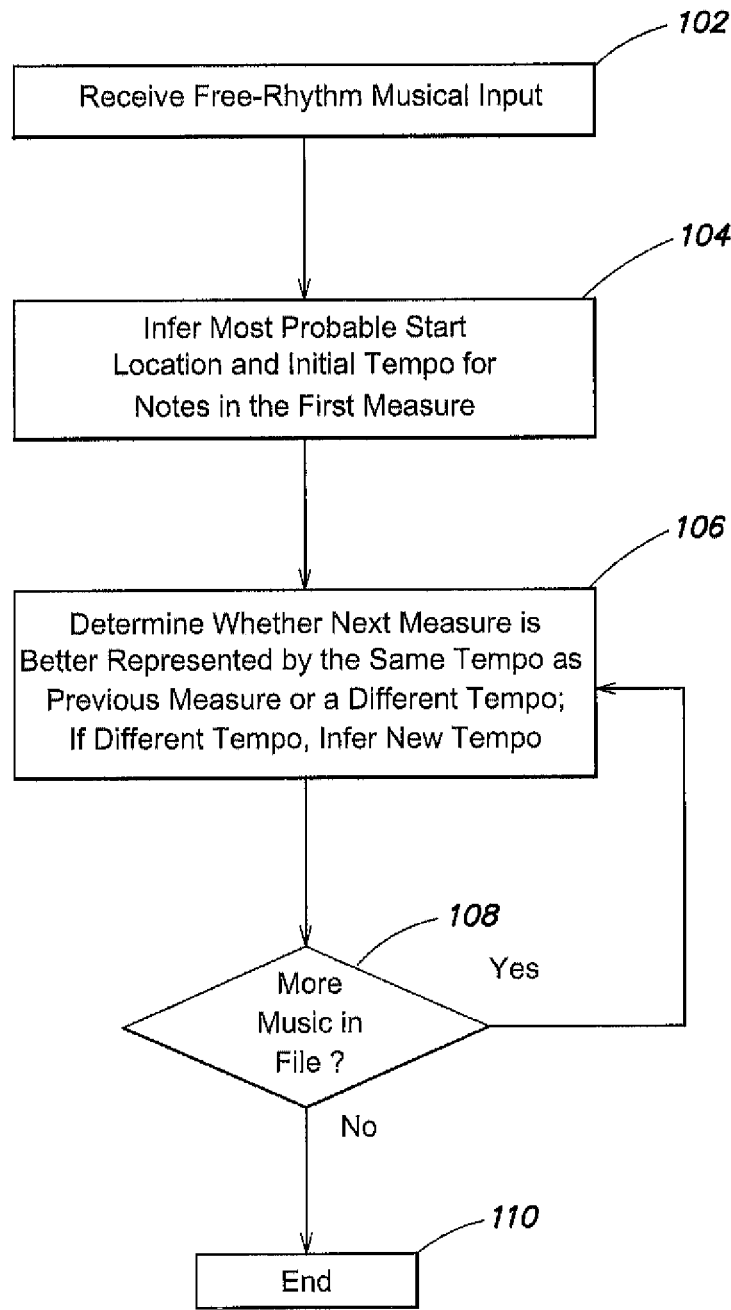
FIG. 1 is high level flow diagram of the described method of inferring a musical grid from free rhythm musical input.

A free rhythm musical input system enables a user to record in a natural manner by not requiring the user to make decisions about tempo or time signatures. It also removes the constraint of playing at a constant tempo that follows a metronome click. In such a system, the user is able to indicate to the system that he is ready to start recording, e.g., by hitting a record button, and take his time to prepare this thoughts, at which time he can start playing in an expressive manner. The system then interprets what the user plays to infer the locations of the measures and beats, and the corresponding tempos and time signatures that best represent the musical intentions of the user.

The system employs a Bayesian probabilistic model for audio. An advantage of Bayesian models is that they can factor in prior knowledge and expectations for how the data is structured. This is especially true for music, since music generally has a high level of structure, which is manifested in its harmonic and rhythmic structure. Furthermore, Bayesian modeling is extensible, in the sense that extra state variables may be added as required to capture different aspects of the structure. Here, the model is applied to the problem of determining the location of the beats in a sequence of notes played without a click. The sequence of notes may be represented as a sequence of MIDI events.

In mathematical terms, the process involves the inference of a metrical grid. As used herein, a metrical grid refers to a sequence of tempo and time signature changes that imply a sequence of beat locations. The metrical grid inference problem may be summarized as: given a sequence of time-stamped notes, find the metrical grid that best represents the data. Restating this as a Bayesian modeling problem, we wish to identify the metrical grid that best explains the given sequence of notes, i.e., to identify the metrical grid that maximizes the a posteriori probability, p(grid|notes), which is the probability of one particular grid representing a particular sequence of notes. Applying Bayes theory, we can express this in terms of the probability of a particular sequence of notes, given a particular grid:

$$p(grid|notes)=p(notes|grid) \times p(grid)/p(notes).$$

For a given set of notes, p(notes) is constant, so it can be disregarded since it does not affect the selection of the optimal grid. p(notes|grid), which is referred to as the likelihood, represents the probability that the particular set of notes would be found given this choice of grid. This is effectively a goodness-of-fit measure that is higher for combinations of notes that align well with the beat positions of the grid.

p(grid) is the a priori probability defining how likely it is that a given grid as represented by a time signature and tempo would be encountered. This can be determined empirically from a corpus of actual real word music. To a first approximation, the expected distribution of tempos is a Gaussian distribution centered on 120 beats per minute (bpm) with a time signature of 4/4. Simpler time signatures are more likely to occur than complex ones, which serves to disfavor overfitting of the data. However, if the input data departs significantly from a regular, simple rhythm, the likelihood of selecting a more complex model increases. In most cases, the model favors a simpler time signature in which local variations in timing, (e.g., from loose playing), are best accommodated by retaining a simple time signature and adjusting the bpm, e.g., 4/4 at 130 bpm with loose timing rather than swung 17/8 at 52 bpm. The application of Bayes theory in this way favors models which are simpler unless there is compelling evidence that a more complex model is justified.

Figure 2:
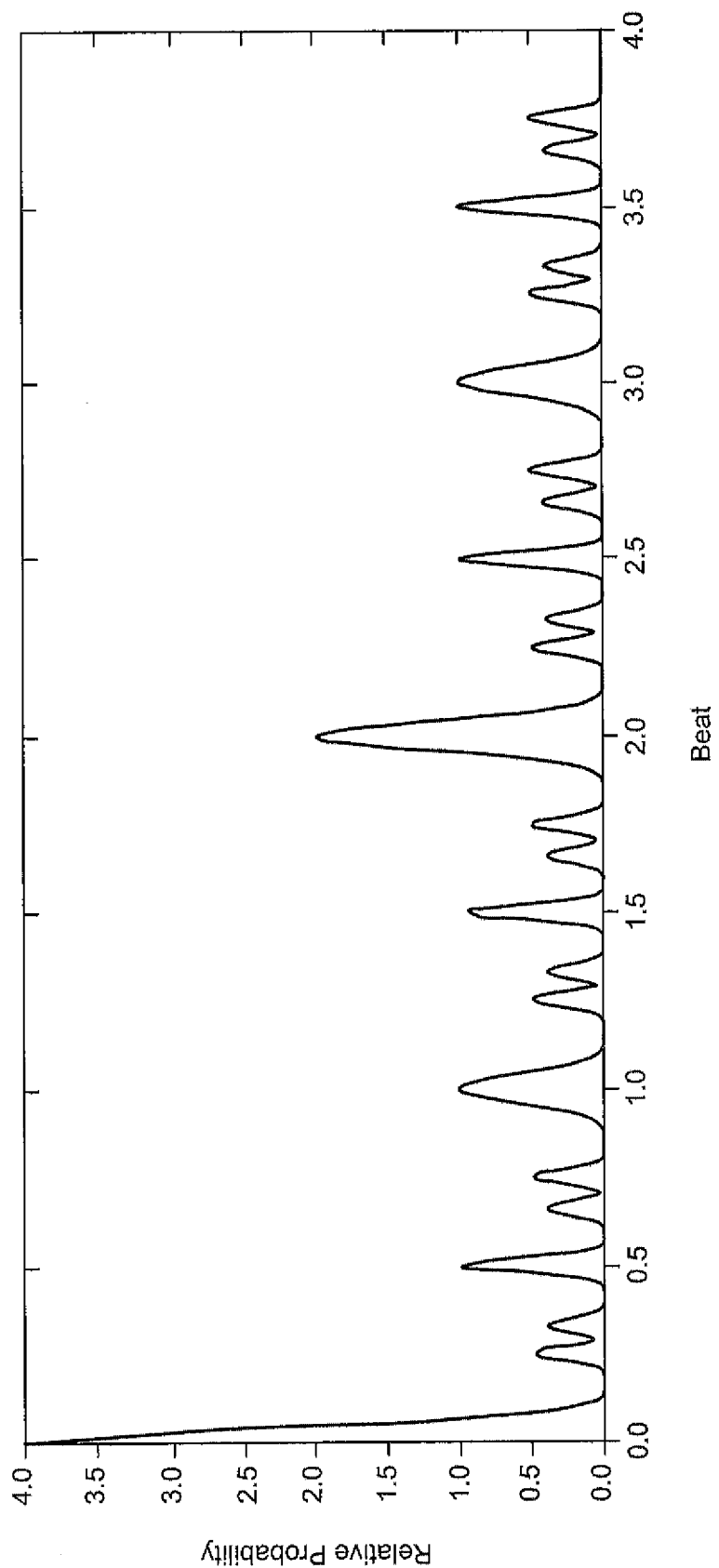
FIG. 2 is a diagram representing a probability distribution for the location of a note within a measure of music.

The process starts with the receipt of music, e.g., as a MIDI file, that has been input without a click, i.e., in free time (FIG. 1, 102). A portion of the received music starting at the beginning of the file is then analyzed to estimate the initial tempo and grid location, i.e., start location in the MIDI input of the first measure of the inferred metrical grid (104). This involves defining the likelihood function p(notes|grid). In musical data, it can be expected that more notes are aligned to the start of the measures than on third beats (half note), individual beats (quarter note), half-beats (eighth note), quarter beats, and triplets. This may be modeled with a probability distribution function. One example of such a function is a mixture of Gaussian distributions centered on each of the measure locations listed above, with decreasing probability amplitude from locations aligned to the start of the measure, to third beats, individual beats, half-beats, etc. Such a probability distribution is illustrated in FIG. 2. In order to evaluate the relative likelihood of a particular tempo given the musical data, the likelihood based on the selected likelihood function is evaluated over a range of tempos. However, the posterior probability rather than the likelihood is what is required, which, using Bayes theory (see above) can be expressed as p(grid|notes)=p(notes|grid)×p(tempo). This weights the likelihood with the prior probability of the tempo distribution p(tempo). As one example, a simple Gaussian distribution with a mean of 120 bpm and a standard deviation of 10 bpm may be used. This choice reflects an expectation that a large majority of source data is expected to lie in the range of 90-150 bpm. For situations in which the style of the musical input is known by the system, either by inference from prior input from a given user, or by explicit selection of a musical style, an a priori probability distribution tailored to that style is used. This may be based on a survey of the music literature corresponding to that style. When such a distribution is used, the model is unlikely to fit tempos outside this range unless the data strongly suggests this. The metrical grid that maximizes the posterior probability is selected. This initial grid, which is based on an initial portion of the MIDI file, is used to provide the starting location and initial tempo.

Following the estimation of starting location and initial tempo, the presence and locations of tempo changes are estimated (106, 108, 110). (In this model, the time signature is assumed to remain unchanged.) The process involves selecting among alternative Bayesian models, i.e., the model in which the tempo does not change from a given measure to the next, and one or more models in which the tempo does change in one or more subsequent measures. In the described embodiment, it is assumed that tempo changes occur only at the start of a new measure. In a simple case, there are two models: M1, having a tempo change at the start of a given measure; and M2, having a tempo change at the start of the given measure as well as a tempo change at the start of the following measure. The model that has the highest posterior probability, given the set of notes d in a given measure and the subsequent measure is selected. In mathematical terms, if $\Phi$ represents the model parameters (i.e., tempo), we wish to work out whether the posterior probability $p(M1, \Phi1|d)$ is greater than $p(M2, \Phi2|d)$. The choice of optimal model necessarily depends on the a priori probability of the model, so the joint posterior probability can be expressed as:

$$p(Mi,\Phi i|d)=p(d|Mi,\Phi i) \times p(\Phi i|d) \times p(Mi),$$

and the problem can be stated as finding i that maximizes $p(Mi, \Phi i|d)$.

Figure 3:
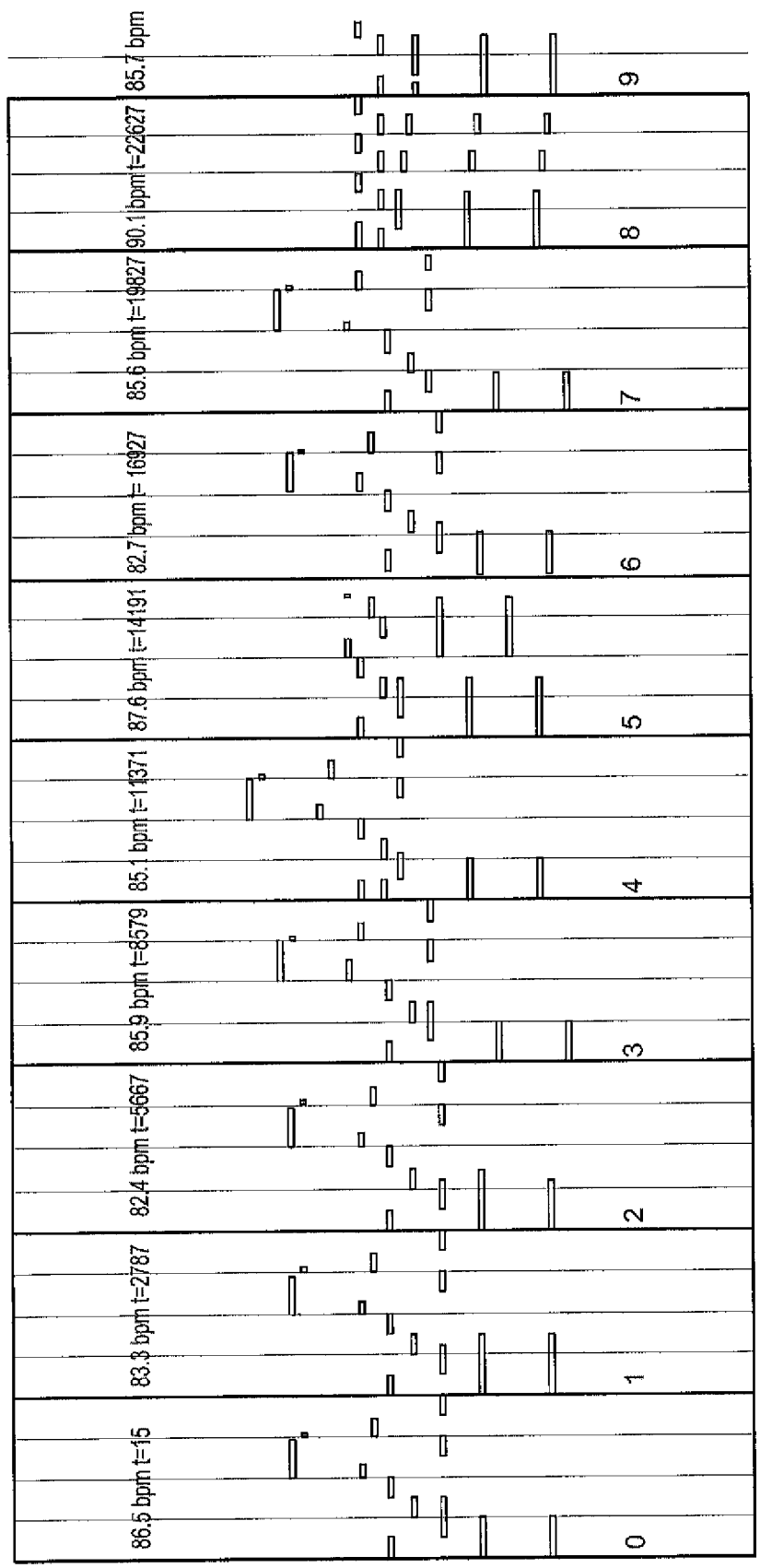
FIG. 3 is an illustration of a metrical grid that has been inferred using the described methods.

In practice the metrical grid model in which the tempo changes slightly from one measure to the next will generally be favored unless the player's input is very regular. Most human playing includes loose timing, as well as deliberate changes in tempo, which are generally best modeled by tempo changes between successive measures. An example of the metric grid selection performed by the described modeling process is illustrated in FIG. 3, which represents the application of the method to a short MIDI file of a performance of Bohemian Rhapsody that was recorded without a metronome click. Bold vertical grid lines indicate where measure lines and tempo changes were detected, and the lighter vertical lines regularly spaced between the measure lines represent the individual beats of each measure. The horizontal bars indicate the location and duration of the notes (in this case, represented by MIDI events) in the file, and it can be seen that these are mostly aligned with the beats of the inferred metrical grid.

In general, musical data having a regular rhythm with bass notes that are on the beat lend themselves well to the detection of a well-fitting metrical grid using the models described above. Musical input in which the performance is more expressive, with a high degree of timing variation not only from one measure to the next, but also from one note to the next (e.g., rubato), may be better represented by models in which intra-measure tempo changes are supported. Other characteristics of the input data that require additional model parameters for effective determination of the metrical grid include time signature changes, pick-up bars, fermata (i.e., pauses), hesitations, wrong notes, and syncopation or strong off-beats or suppressed eighth notes such as are often found in jazz, blues, and reggae.

The use of Bayesian modeling facilitates the incorporation of information about past music input from a given user or class of users into the a priori probability distribution of metrical grids. This may improve the quality of subsequent metrical grid inference, and result in a more reliable and accurate transcription. In other words, the system is able to adapt to a user. For example, after receiving input in a jazz style, the system learns to increase the a priori probability of rhythms that include off-beats. Alternatively, or in addition, a user may supply explicit information about the musical style or rhythm, such as by specifying a musical style, e.g., classical, jazz, blues, or reggae, thereby pre-configuring the system to favor metrical grids favored by the specified style.

The determination of a metrical grid for free rhythm musical input allows the sequence of notes in the free rhythm musical input to be annotated with the metrical grid, and stored in association with the grid. Storing may be performed on a local memory, e.g., RAM, magnetic disc, solid-state disk, or on a server hosted over a local area or wide area network. The recorded music can be played back in a manner in which the inferred tempo changes are ironed out, or changed into another sequence of tempos. Other uses include the transcription of a musical score based on the inferred metrical grid with its time signature, tempo, and measures, and the ability to create recording loops.

In the system described above, the free rhythm music is received in the form of a sequence of MIDI events, in which the temporal locations of the notes and their duration are provided explicitly. It may also be possible to receive the music in audio form, and use audio analysis tools to determine the temporal locations of the note onsets and, in some cases, also the durations of the notes within the audio, thus broadening the applicability of the described techniques to acoustic performances or recordings.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, audio output devices such as loudspeakers, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, musical instruments that generate a MIDI sequence, digital audio or analog audio, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media, such as music or video may be stored on and input from magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for free rhythm musical input, the method comprising:
 receiving musical input comprising a sequence of notes;
 determining an optimal metrical grid corresponding to the sequence of notes, wherein the optimal metrical grid is defined as the metrical grid that optimally represents the sequence of notes, and wherein determining the optimal metrical grid is based in part on an a priori probability of the occurrence of the optimal metrical grid, wherein the a priori probability is independent of the sequence of notes;

annotating the musical input with the optimal metrical grid; and storing a representation of the annotated musical input.

2. The method of claim 1, wherein the metrical grid comprises a time signature and a tempo.

3. The method of claim 2, further comprising generating a musical score representing the sequence of notes using the time signature and tempo.

4. The method of claim 2, wherein the optimal metrical grid comprises a plurality of tempos including the first-mentioned tempo.

5. The method of claim 4, wherein each of the plurality of tempos starts at the beginning a measure based on the time signature.

6. The method of claim 4, wherein one or more of the plurality of tempos starts at a location other than the beginning of a measure based on the time signature.

7. The method of claim 4, wherein an priori probability of a given one of the plurality of tempos representing a portion of the musical input is based in part on a characteristic of a portion of the musical input received prior to receiving the given portion.

8. The method of claim 4, wherein the optimal metrical grid comprises a plurality of time signatures, including the first-mentioned time signature.

9. The method of claim 1 further comprising determining a start location for the optimal metrical grid.

10. The method of claim 1, further comprising modifying the musical input by adjusting a temporal location of at least one of the sequence of notes to more closely conform to the optimal metrical grid.

11. The method of claim 1, wherein the sequence of notes is represented as a sequence of MIDI events.

12. The method of claim 1, wherein the musical input is received as audio input, and the sequence of notes is determined by analyzing the audio input.

13. The method of claim 1, wherein determining the optimal metrical grid is involves Bayesian modeling of the probabilities of a range of possible metrical grids for representing the sequence of notes.

14. The method of claim 1, wherein the a priori probability of the occurrence of the metrical grid is based in part on information about a musical style of the musical input.

15. The method of claim 1, wherein the musical input is received from a given user, and the a priori probability of the occurrence of the metrical grid is based in part on a musical style of the given user.

16. A computer program product, comprising:
a non-transitory computer-readable medium with computer program instructions encoded thereon, wherein the computer program instructions, when processed by a computer, instruct the computer to perform a method for free rhythm musical input, the method comprising:
receiving musical input comprising a sequence of notes;
determining an optimal metrical grid corresponding to the sequence of notes, wherein the optimal metrical grid is defined as the metrical grid that optimally represents the sequence of notes, and wherein determining the optimal metrical grid is based in part on an a priori probability of the occurrence of the optimal metrical grid, wherein the a priori probability is independent of the sequence of notes;
annotating the musical input with the optimal metrical grid; and
storing a representation of the annotated musical input.

17. A system for free time musical input, the system comprising:
an input for receiving music data comprising a sequence of notes;
a memory for storing computer-readable instructions; and
a processor connected to the memory, wherein the processor, when executing the computer-readable instructions, causes the free time musical input system to:
determine an optimal metrical grid corresponding to the sequence of notes, wherein the optimal metrical grid is defined as the metrical grid that optimally represents the sequence of notes, and wherein determining the optimal metrical grid is based in part on an a priori probability of the occurrence of the optimal metrical grid, wherein the a priori probability is independent of the sequence of notes;
annotate the musical input with the optimal metrical grid; and
store a representation of the annotated musical input.

* * * * *